United States Patent
Levit et al.

(10) Patent No.: US 8,180,641 B2
(45) Date of Patent: May 15, 2012

(54) SEQUENTIAL SPEECH RECOGNITION WITH TWO UNEQUAL ASR SYSTEMS

(75) Inventors: Michael Levit, Mountain View, CA (US); Shuangyu Chang, Fremont, CA (US); Bruce Melvin Buntschuh, Mountain View, CA (US)

(73) Assignee: Microsoft Corporation, Redmond, WA (US)

( * ) Notice: Subject to any disclaimer, the term of this patent is extended or adjusted under 35 U.S.C. 154(b) by 892 days.

(21) Appl. No.: 12/240,143

(22) Filed: Sep. 29, 2008

(65) Prior Publication Data
US 2010/0082343 A1    Apr. 1, 2010

(51) Int. Cl.
*G10L 15/28* (2006.01)
(52) U.S. Cl. .. 704/255; 704/252; 704/257; 704/E15.021
(58) Field of Classification Search ................. 704/252, 704/255, 257
See application file for complete search history.

(56) References Cited

U.S. PATENT DOCUMENTS

| | | | | |
|---|---|---|---|---|
| 5,097,509 | A * | 3/1992 | Lennig | 704/240 |
| 5,737,489 | A * | 4/1998 | Chou et al. | 704/256 |
| 5,991,720 | A | 11/1999 | Galler | |
| 6,185,530 | B1 | 2/2001 | Ittycheriah | |
| 6,195,634 | B1 * | 2/2001 | Dudemaine et al. | 704/231 |
| 6,223,155 | B1 * | 4/2001 | Bayya | 704/243 |
| 6,757,655 | B1 * | 6/2004 | Besling et al. | 704/270.1 |
| 6,928,404 | B1 | 8/2005 | Gopalakrishnan | |
| 7,031,915 | B2 * | 4/2006 | Baker | 704/231 |
| 7,149,689 | B2 | 12/2006 | Yacoub | |
| 7,487,091 | B2 * | 2/2009 | Miyazaki | 704/255 |
| 2001/0018654 | A1 * | 8/2001 | Hon et al. | 704/257 |
| 2004/0153319 | A1 * | 8/2004 | Yacoub | 704/240 |
| 2004/0186714 | A1 * | 9/2004 | Baker | 704/236 |
| 2005/0209854 | A1 * | 9/2005 | Abrego et al. | 704/252 |
| 2005/0273334 | A1 * | 12/2005 | Schleifer et al. | 704/255 |
| 2006/0009980 | A1 | 1/2006 | Burke | |
| 2006/0080105 | A1 | 4/2006 | Lee | |
| 2006/0167692 | A1 * | 7/2006 | Basu et al. | 704/258 |
| 2007/0038436 | A1 * | 2/2007 | Cristo et al. | 704/9 |
| 2007/0038454 | A1 | 2/2007 | Eckhart | |
| 2007/0219793 | A1 * | 9/2007 | Acero et al. | 704/240 |
| 2007/0271088 | A1 | 11/2007 | Waibel | |
| 2008/0126100 | A1 * | 5/2008 | Grost et al. | 704/275 |
| 2008/0162137 | A1 * | 7/2008 | Saitoh et al. | 704/251 |
| 2009/0150154 | A1 * | 6/2009 | Jang et al. | 704/254 |

OTHER PUBLICATIONS

Scharenborg et al. "A Two-pass Strategy for Handling OOVs in a Large Vocabulary Recognition Task" 2005.*
Palmer et al. "Improving out-of-vocabulary name resolution" 2004.*
Vanhoucke. "Confidence Scoring and Rejection using Multi-Pass Speech Recognition" 2005.*
Mao et al. "Automatic Training Set Segmentation for Multi-Pass Speech Recognition" 2005.*
Yu et al. "N-Gram Based Filler Model for Robust Grammar Authoring" 2006.*

(Continued)

*Primary Examiner* — Richemond Dorvil
*Assistant Examiner* — Greg Borsetti
(74) *Attorney, Agent, or Firm* — Merchant & Gould P.C.

(57) ABSTRACT

Sequential speech recognition using two unequal automatic speech recognition (ASR) systems may be provided. The system may provide two sets of vocabulary data. A determination may be made as to whether entries in one set of vocabulary data are likely to be confused with entries in the other set of vocabulary data. If confusion is likely, a decoy entry from one set of the vocabulary data may be placed in the other set of vocabulary data to ensure more efficient and accurate speech recognition processing may take place.

20 Claims, 4 Drawing Sheets

OTHER PUBLICATIONS

Bazzi et al. "Modeling Out-of-Vocabulary Words for Robust Speech Recognition" 2000.*

Sharenborg et al, "Early Recognition of Polysyllabic Words in Continuous Speech", (2006), 18 pages.

* cited by examiner

SEQUENTIAL SPEECH RECOGNITION WITH TWO UNEQUAL ASR SYSTEMS

BACKGROUND

Sequential speech recognition using two unequal automatic speech recognition (ASR) systems is a process for providing reliable speech recognition while efficiently managing system resources. The more sophisticated an ASR system is, the more system resources (such as time, memory, computational power) it may require. Thus, a trade-off between accuracy and the amount of claimed resources may often need to be balanced. To solve this problem one may sequentially apply a number of recognition systems in the order of increasing complexity. In the framework of this strategy, the decision must be made as to when the next system should be used. One solution to this problem is the subject of the present patent.

SUMMARY

Sequential speech recognition using two unequal automatic speech recognition (ASR) systems may be provided. This Summary is provided to introduce a selection of concepts in a simplified form that are further described below in the Detailed Description. This Summary is not intended to identify key features or essential features of the claimed subject matter. Nor is this Summary intended to be used to limit the claimed subject matter's scope.

A method for sequential speech recognition using two unequal automatic speech recognition (ASR) systems may be provided. The method may comprise providing two pluralities of vocabulary data, adding at least one decoy entry to the first plurality of vocabulary data from the second plurality of vocabulary data, receiving an input comprising an audio signal, determining whether the input reliably matches at least one original entry in the first plurality of vocabulary data, whether the input matches at least one decoy entry in the first vocabulary data, and determining whether the second plurality of vocabulary data needs to be involved in the recognition process.

Both the foregoing general description and the following detailed description provide examples and are explanatory only. Accordingly, the foregoing general description and the following detailed description should not be considered to be restrictive. Further, features or variations may be provided in addition to those set forth herein. For example, embodiments may be directed to various feature combinations and subcombinations described in the detailed description.

BRIEF DESCRIPTION OF THE DRAWINGS

The accompanying drawings, which are incorporated in and constitute a part of this disclosure, illustrate various embodiments of the present invention. In the drawings.

DETAILED DESCRIPTION

The following detailed description refers to the accompanying drawings. Wherever possible, the same reference numbers are used in the drawings and the following description to refer to the same or similar elements. While embodiments of the invention may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the invention. Instead, the proper scope of the invention is defined by the appended claims.

Figure 1:
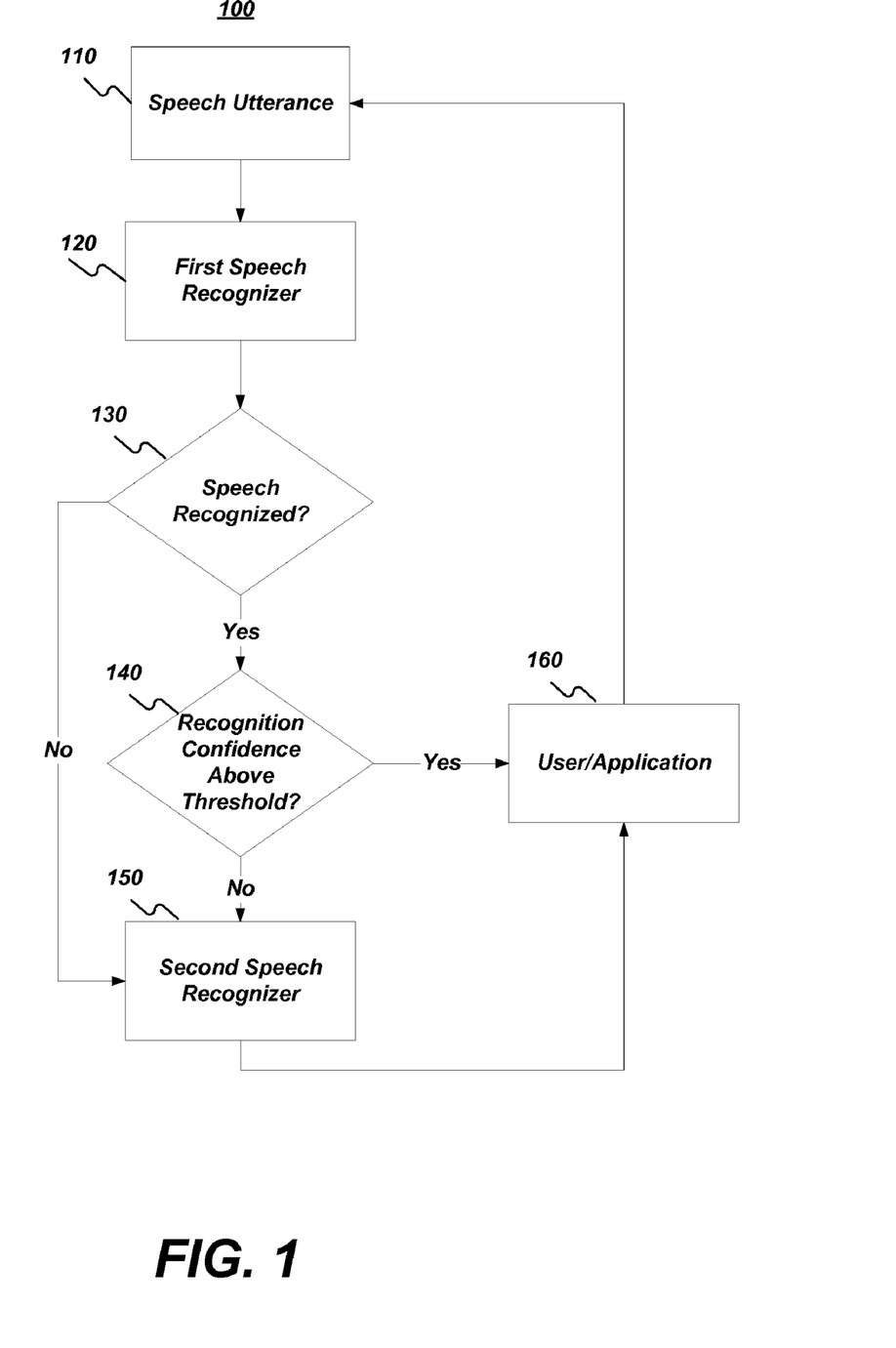
FIG. 1 is a data flow diagram of a system for providing efficient speech recognition.

Sequential speech recognition using two unequal automatic speech recognition (ASR) systems may be provided. Unequal speech recognition systems may comprise a first system having a small number of vocabulary entries and a second system comprising a larger number of vocabulary entries. Consistent with embodiments of the present invention, two separate speech recognition resources may be used to balance speed and accuracy in recognizing speech received as an audio signal. For example, the first system may comprise 300-500 vocabulary entries from a user's address book and the second system may comprise 300,000-500,000 vocabulary entries from a business directory. FIG. 1 is a flow diagram of a system 100 for providing efficient speech recognition and may be embodied in a computer. The computer may be described in more detail by the system of FIG. 4, described below.

In system 100, a speech utterance 110 may be received from a source 160, such as a user or software application. Utterance 110 may be passed to a first speech recognizer 120, which may comprise vocabulary entries comprising a plurality of words and/or phrases. Utterance 110 may then be compared to each of the vocabulary entries to determine whether utterance 110 may be recognized 130 as matching at least one of the vocabulary entries. A recognition score may be calculated for each comparison between utterance 110 and one of the vocabulary entries, and the entry with the highest recognition score may be treated as the closest match for the utterance 110. The recognition score may be generated using a speech recognition technique, such as a Markov Model as described in U.S. Pat. Nos. 5,937,384 and 5,710,866, both assigned to Microsoft® Corporation and which are hereby incorporated by reference in their entirety, or by way of the comparisons described below in greater detail with respect to FIG. 3.

First speech recognizer 120 may also comprise at least one decoy entry. Consistent with embodiments of the invention, each original entry may be associated with at least one decoy entry. The at least one decoy entry may be added to first speech recognizer 120 based on a comparison between the vocabulary entries in first speech recognizer 120 and a second speech recognizer 150. Decoy entries in first speech recognizer 120 represent vocabulary entries in second speech recognizer 150 that may be confused with an original entry in first speech recognizer 120. Consistent with embodiments of the invention, second speech recognizer 150 may comprise a larger vocabulary set than first speech recognizer 120. For example, first speech recognizer 120 may comprise vocabulary entries from a user's contact list and may include an action command of "Call Lee Flower." Second speech recognizer may comprise vocabulary entries from a general dictionary list of English language words and may include an entry of "cauliflower." A comparison of "Call Lee Flower" and "cauliflower" may result in a finding that the two entries are likely to be confused, and so a decoy entry of "cauliflower" may be added to first speech recognizer 120.

If the closest match, based on the recognition score between utterance 110 and an entry in first speech recognizer's 120 vocabulary entries, comprises an original entry in first speech recognizer's 120 vocabulary, system 100 may calculate a confidence score associated with the comparison. The confidence score may reflect first speech recognizer's 120 certainty in determination of the closest match. For example, recognition scores of all entries may be converted to posterior probabilities and the confidence may be computed as a difference between posterior probability of the closest match and the next highest posterior probability. A larger difference may represent a higher confidence that the closest match to the utterance is accurate.

The confidence score may then be evaluated to determine whether the closest match entry in first speech recognizer 120 is greater than a confidence threshold. The confidence threshold may be associated with the individual vocabulary entry in first speech recognizer 120, and may be separately configurable from the confidence threshold of other vocabulary entries in first speech recognizer 120. Consistent with embodiments of the invention, each vocabulary entry in first speech recognizer 120 may comprise the same confidence threshold. System 100 may adjust confidence thresholds for at least one of the vocabulary entries in first speech recognizer 120 and second speech recognizer 150. For example, system 100 may increase a confidence threshold of an entry in response to a voice training operation that may indicate a particular user is more likely to generate confusion between the entry and a second entry in first speech recognizer 120. System 100 may also periodically update confidence thresholds for at least one entry in first speech recognizer 120 and second speech recognizer 150 according to aggregated data from a plurality of users and/or data collected from at least one user of system 100. Initial confidence thresholds may be established according to language analysis of phonemes associated with each vocabulary entry which are likely to be confused and/or data gathered from a plurality of speech recognition system users.

If the confidence score associated with the closest match in first speech recognizer 120 is greater than the associated confidence threshold, system 100 may inform source 160 of the matching result. Consistent with embodiments of the invention, system 100 may send the matching result to another recipient, such as another software application module, for further processing.

If the closest match, based on the recognition score between the utterance and an entry in the first recognizer's vocabulary entries, comprises a decoy entry, system 100 may pass utterance 110 to second speech recognizer 150. Consistent with embodiments of the invention, system 100 may pass utterance 110 to second speech recognizer 150 if the confidence score associated with a recognition score on an original vocabulary entry in first speech recognizer 120 is below the confidence threshold associated with the original vocabulary entry. Second speech recognizer 150 may then determine a recognition score for each vocabulary entry in second speech recognizer 150 based on a comparison of each entry to utterance 110. As with the first speech recognizer, the entry in the second recognizer's vocabulary whose comparison results in the highest recognition score may be considered the closest match to the utterance. Second speech utterance 110 may then send the vocabulary entry comprising the highest confidence value to source 160 as a matching entry. Consistent with embodiments of the invention, second speech recognizer may also require a recognition confidence threshold for each vocabulary entry before considering the entry to match utterance 110. If no vocabulary entry in second speech recognizer 150 comprises a confidence value over the recognition confidence threshold, second speech recognizer may return an empty result and/or an error message to source 160. If the confidence score associated with the closest match in second speech recognizer 150 is greater than the associated confidence threshold, system 100 may inform source 160 of the matching result. Consistent with embodiments of the invention, second speech recognizer 150 may not calculate a confidence score or compare the confidence score to a confidence threshold. System 100 may send the closest match, as determined by the vocabulary entry in second speech recognizer 150 as having the highest recognition score, as the matching result to source 160 and/or another recipient regardless of the confidence score.

Figure 2:
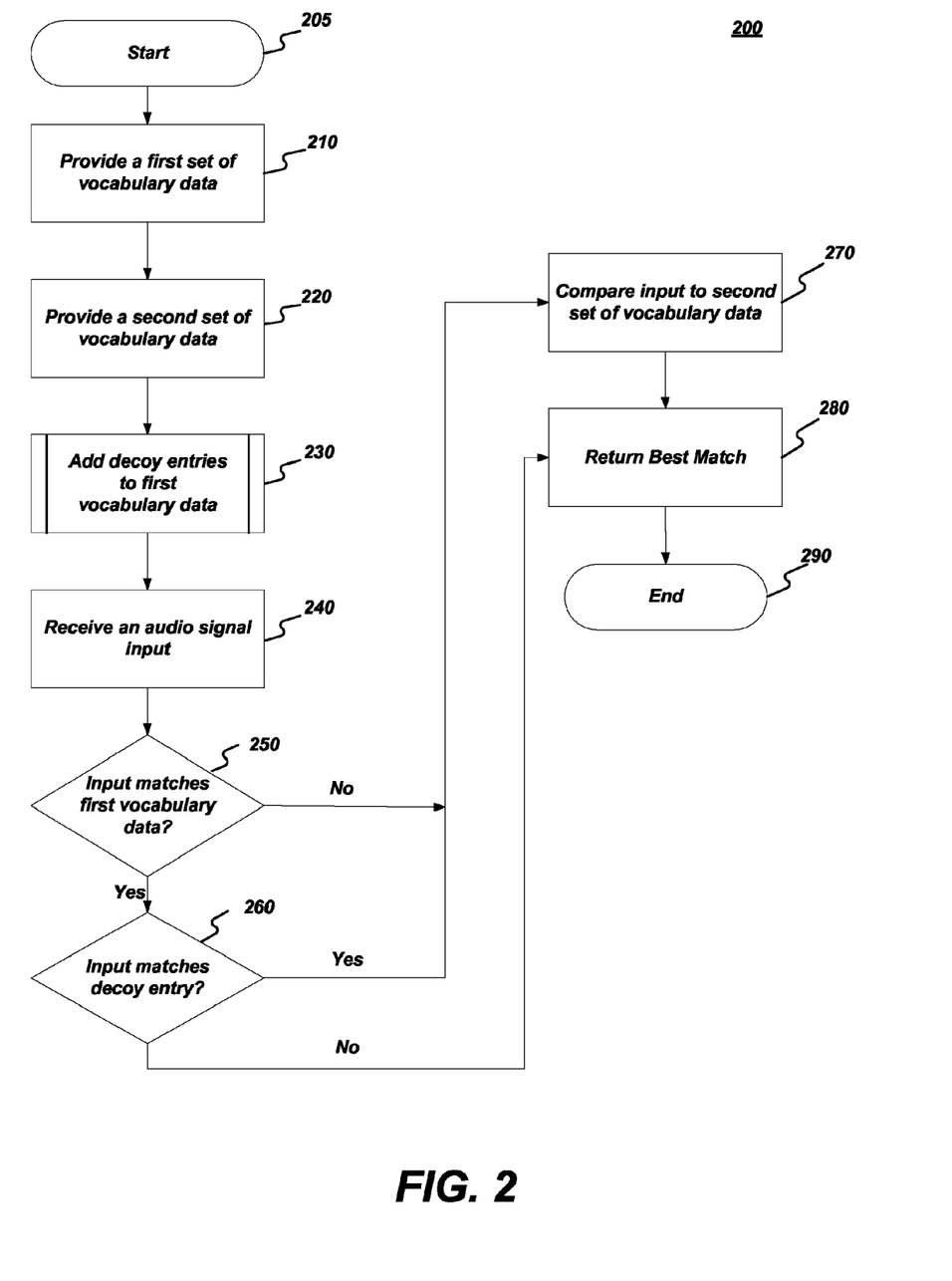
FIG. 2 is a flow chart of a method for providing efficient speech recognition.

FIG. 2 is a flow chart setting forth the general stages involved in a method 200 consistent with an embodiment of the invention for providing efficient speech recognition. Method 200 may be implemented using a computing device 400 as described in more detail below with respect to FIG. 4. Ways to implement the stages of method 200 will be described in greater detail below. Method 200 may begin at starting block 205 and proceed to stage 210 where computing device 400 may provide a first set of vocabulary data. For example, first speech recognizer 120 may comprise a set of vocabulary data generated from a user's address book comprising contact names, phone numbers, and addresses.

From stage 210, method 200 may advance to stage 220 where computing device 400 may provide a second set of vocabulary data. For example, second speech recognizer 150 may comprise a set of vocabulary data based on a business directory. Consistent with embodiments of the invention, the second set of vocabulary data may comprise less preferred matching terms according to the system's design goals. The second set of vocabulary data may comprise a greater number of entries than the first set of vocabulary data.

Once computing device 400 provides the second set of vocabulary data in stage 220, method 200 may continue to stage 230 where computing device 400 may add decoy entries to the first set of vocabulary data. Decoy entries may represent entries from the second set of vocabulary data that have a high likelihood of confusion with entries in the first set of vocabulary data. For example, the first set of vocabulary data may include the action "Call Lee Flower" and the second set of vocabulary data may include the word "cauliflower". In such a case, computing device 400 may add a decoy entry of "cauliflower" to the first set of vocabulary data and associate the decoy entry of "cauliflower" with the original entry of "Call Lee Flower". Adding decoy entries to the first set of vocabulary data is discussed in greater detail below with respect to FIG. 3.

After computing device 400 adds at least one decoy entry to the first plurality of vocabulary data in stage 230, method 200 may proceed to stage 240 where computing device 400 may receive an audio signal input. For example, computing device 400 may receive an input comprising a speech utterance from a user via an audio input device such as a microphone. Consistent with embodiments of the invention, computing device 400 may receive the audio signal input from a software module or a second computing device.

From stage 240, computing device 400 may attempt to recognize the audio signal input by proceeding to stage 250 where computing device 400 may determine whether the input matches at least one entry in the first set of vocabulary data. A recognition score may be assigned to each comparison between the utterance and each entry in the first set of vocabulary data.

Computing device 400 may then determine whether at least one comparison between the input and each entry in the first set of vocabulary data resulted in a match by calculating a confidence score based on the recognition scores associated with the comparisons between the utterance and each entry in the first set of vocabulary data. The confidence score may represent a difference between the highest and next-highest recognition scores and may be compared to a confidence threshold associated with each entry in the first set of vocabulary data. Consistent with embodiments of the invention, computing device 400 may determine that the highest recognition score may be treated as a match.

The associated confidence threshold may also take context into account by examining an association between the input and a preceding and/or following speech input. For example, an input of "Call Lee Flower" may be examined to determine whether a preceding speech input such as "Phone" may indicate by context that the first word is "call" and not the first syllable of "cauliflower", while a following input of "produce" may better match a business directory listing in the second set of vocabulary for "Cauliflower" as a business name in a produce category.

If computing device 400 determines that the input matches at least one entry in the first set of vocabulary data, method 200 may advance to stage 260, where computing device 400 may determine whether the matched entry may comprise at least one decoy entry added from the second set of vocabulary data.

If, after comparing the input to each entry in the first set of vocabulary data, computing device 400 determines that no match has been made with sufficient confidence, method 200 may advance to stage 270 where computing device may compare the input to each entry in the second set of vocabulary data. For example, after stage 250, computing device 400 may have indicated a match on a comparison of a speech input of "Call Lee Flower" and a decoy entry of "cauliflower" in the first set of vocabulary data. Upon advancing to stage 260, computing device 400 may determine that "cauliflower" is a decoy entry. Computing device 400 may then proceed to compare the input against the second set of vocabulary data rather than treating the comparison as a successful match and returning the result to source 160 of the input or another requester or assigned destination at stage 280.

Figure 4:
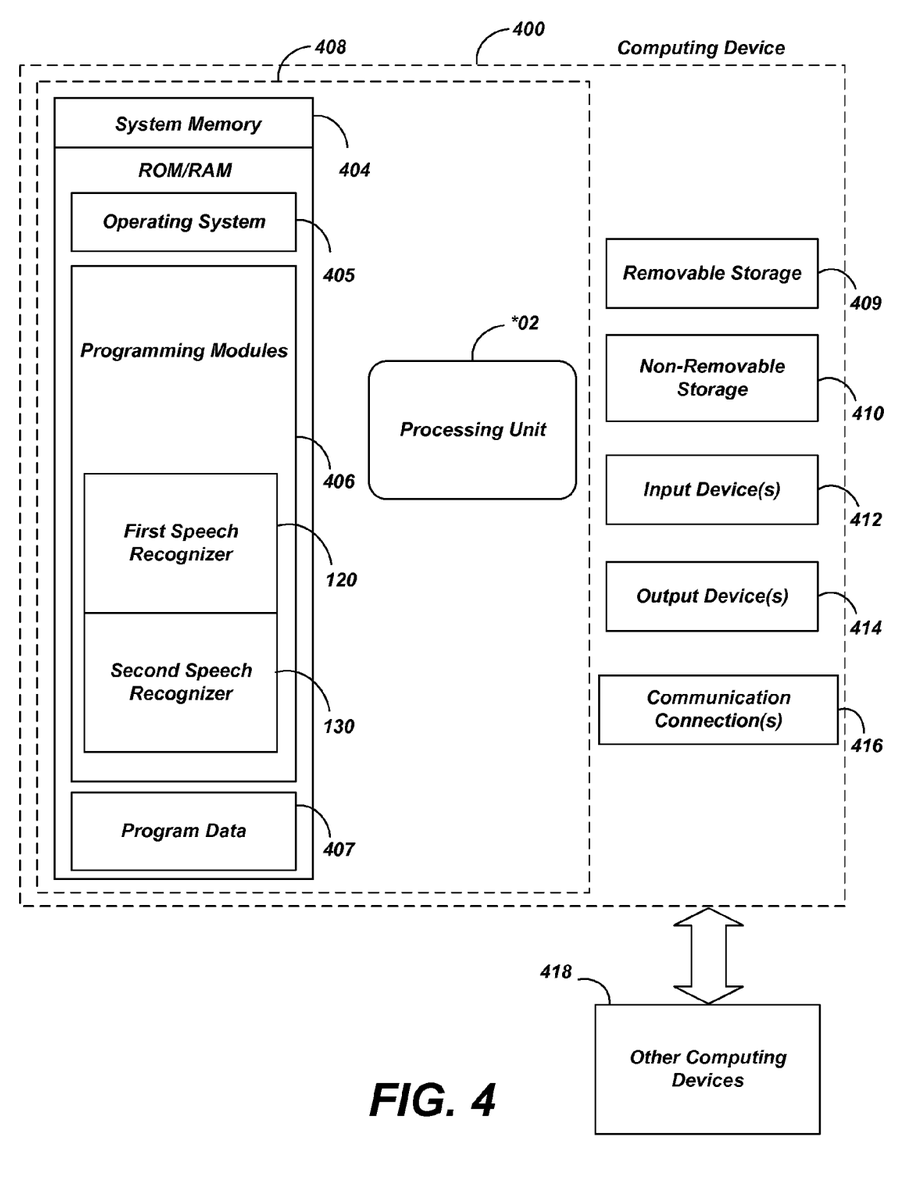
FIG. 4 is a block diagram of a system including a computing device.

At stage 270 of method 200, computing device may repeat a similar comparison between the input and each entry in the second set of vocabulary data, as described above with respect to the first set of vocabulary data. Consistent with embodiments of the invention, the second set of vocabulary data may comprise a larger number of word and/or phrase entries than the first set of vocabulary data. Further consistent with embodiments of the invention, the second set of vocabulary data may comprise a separate database, file structure, or other resource than the first set of vocabulary data and may be co-located on a storage medium (e.g. a removable storage 409 or a non-removable storage 410) with the first vocabulary data. The second set of vocabulary data may be located on a different storage medium or a second computing device 418 operative to communicate with computing device 400 via a communication connection 416. For example, the first set of vocabulary data may comprise an embedded resource on a client device such as a cellular telephone while the second set of vocabulary data may comprise a server resource located on second computing device 418 operative to communicate with the client device via a cellular network.

From stage 270, method 200 may proceed to stage 280 where computing device 400 may return a best match to the input from the second set of vocabulary data. The best match may be considered to be an entry from the second set of vocabulary data whose comparison with the input resulted in the highest recognition score. Consistent with embodiments of the invention, computing device 400 may return a "no match" result and/or an error message if no comparison resulted in a sufficiently high recognition score. From stage 280, method 200 may end at stage 290.

Consistent with embodiments of the invention, system 100 may receive a new entry to the first plurality of vocabulary data. For example, a user may add a new contact to an address book associated with the first plurality of vocabulary data. System 100 may determine whether the new entry may be confusable with at least one entry in the second plurality of vocabulary data as described above with respect to FIG. 1. In response to determining that the new entry may be confusable with at least one entry in the second plurality of vocabulary data, system 100 may add a decoy entry to the first plurality of vocabulary data comprising the confusable entry from the second plurality of vocabulary data.

In the course of performing method 200, computing device 400 may be operable to receive feedback from a user regarding the success or failure of attempts to recognize speech inputs as matching entries in the first and second sets of vocabulary data. For example, a user may indicate that computing device 400 incorrectly returned "Microsoft" as a result from the second set of vocabulary data instead of "Mister Soft" from the first set of vocabulary data. Computing device 400 may create training data comprising a record of the confusion between the entries in the first and second sets of vocabulary data. Consistent with embodiments of the invention, computing device 400 may add a decoy entry to the first set of vocabulary data in response to receiving an indication that entries between the first and second sets of vocabulary data have been confused. Further consistent with embodiments of the invention, computing device 400 may periodically re-compare the first and second sets of vocabulary data and add and/or remove decoy entries from the first set of vocabulary data based on a user's history. Computing device 400 may also periodically adjust confidence thresholds associated with entries in the first and second sets of vocabulary data according to the user's history.

Figure 3:
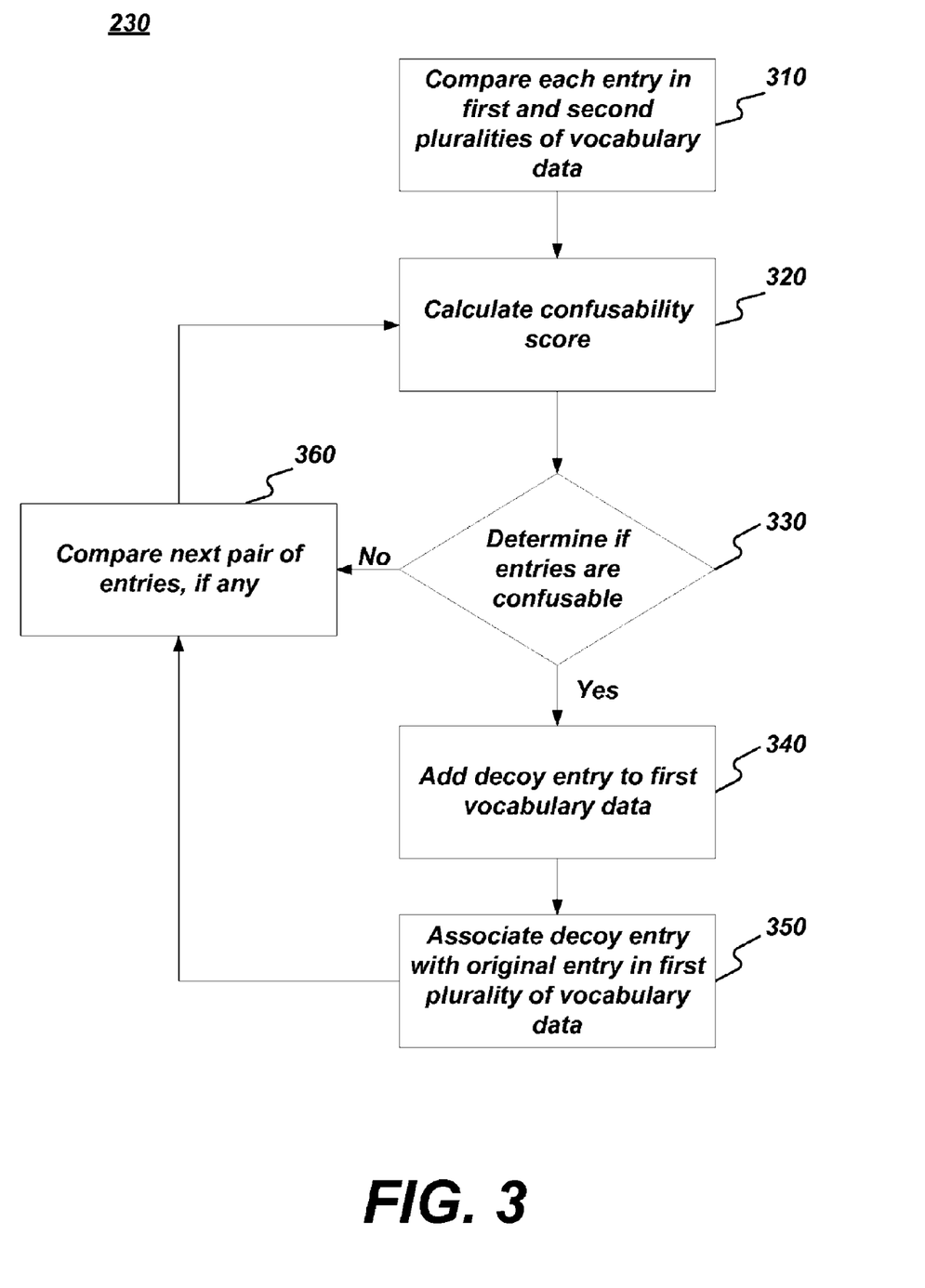
FIG. 3 is a flow chart of a subroutine used in the method of FIG. 2 for adding at least one decoy entry to a first set of vocabulary data.

FIG. 3 is a flow chart of a subroutine 230 of method 200 of FIG. 2 for adding at least one decoy entry to a first set of vocabulary data. Subroutine 230 may cause computing device 400 to begin at stage 310 by looping through each entry in the first set of vocabulary data and comparing it to each entry in the second set of vocabulary data. From stage 310, subroutine 230 may advance to stage 320 where computing device 400 may calculate a confusability score for the entry in the first set of vocabulary data as compared to an entry in the second set of vocabulary data. For example, the confusability score may comprise an edit distance between phonetic representations of the entries, such as a Levenshtein edit distance wherein each letter that differs between the two textual representations adds to an edit distance score. Consistent with embodiments of the invention, each type of phoneme difference between the two phonetic representations adds a constant distance score to an overall edit distance score. Each phoneme difference between two phonetic representations may be of type insertion, deletion, or substitution, and each of these types may have a fixed distance score. The confusability score may be inversely correlated to the edit distance.

Consistent with embodiments of the invention, the distance scores within each type of the phoneme difference may vary according to pronunciation differences in phonemes of a selected language. For example, /sh i p/ (a phonetic representation of "sheep") may be less confusable with /sh aa p/ (a phonetic representation of "shop") than with /sh ih p/ (a phonetic representation of "ship"). A confusability score may be generated on the basis of phoneme-wise confusabilities using Dynamic Programming or other aggregating methods. The edit distance between "sheep" and "ship" may be lower than between "sheep" and "shop"; thus "ship" may be more likely to be selected as a decoy for "sheep" than "shop".

Consistent with further embodiments of the invention, the confusability score may also be generated by deriving a metric of natural confusability from a large set of training data directly at the level of entries, not at the level of phonemes. For example, based on the frequency of confusion between "Call Lee Flower" and "cauliflower" in a training data set, a confusability score may be defined directly between "Call Lee Flower" and "cauliflower". The training data set may be a set of automatic speech recognition results, or a set of human listening results. From stage 320, subroutine 230 may advance to stage 330, where computing device 400 may determine whether the entry from the first set of vocabulary and the entry from the second set of vocabulary data are confusable. For example, computing device 400 may calculate an edit distance between /m a n/ (a phonetic representation of "man") and /m ah n k/ (a phonetic representation of "monk") of 1.5 based on adding 0.5 for substituting /a/ for /ah/ with 1.0 for inserting an additional /k/. System 100 may be configured to treat an edit distance less than 1.2 as confusable so that "man" and "monk" are determined not to be confusable entries.

If the entries are not determined to be confusable, subroutine 230 may advance to stage 360, where computing device 400 may compare the entry from the first set of vocabulary data to a next entry from the second set of vocabulary data. If the entry from the first set of vocabulary data has been compared to all of the entries in the second set of vocabulary data, computing device 400 may proceed to a next entry from the first set of vocabulary data and compare the next entry from the first set of vocabulary data to each entry in the second set of vocabulary data. If all of the entries from the first set of vocabulary data have been compared to all of the entries from the second set of vocabulary data, subroutine 230 may proceed to stage 240 of method 200.

If, at stage 330, computing device 400 determines that the entries are confusable, subroutine 230 may advance to stage 340 where computing device 400 may insert a decoy entry into the first set of vocabulary data comprising the confusable entry from the second set of vocabulary data. For example, computing device 400 may determine that a phrase of "Call Lee Flower" in the first set of vocabulary data may be confusable with "cauliflower" in the second set of vocabulary data and add a decoy entry of "cauliflower" to the first set of vocabulary data. Consistent with embodiments of the invention, adding decoy entries to the first set of vocabulary data enables system 100 to provide improved recognition accuracy to source 160 by causing computing device 400 to perform further processing on speech inputs with a high degree of likelihood of confusion. System 100 may thus provide increased efficiency by not proceeding to compare an input against the second, potentially much larger, set of vocabulary data when confidence in a match against an entry in the first set of vocabulary data is sufficiently high.

After adding the decoy entry to the first set of vocabulary data at stage 340, subroutine 230 may proceed to stage 350, where computing device 300 may associate the decoy entry with the original entry in the first set of vocabulary data. Consistent with embodiments of the invention, computing device 400 may adjust the confidence threshold for the original entry from the first set of vocabulary data to require a greater degree of confidence in comparing an input to the original entry from the first set of vocabulary data before determining that a match has occurred. Further consistent with embodiments of the invention, computing device 400 may require that the input be compared against the second set of vocabulary data when the input matches any decoy entry in the first set of vocabulary data.

From stage 350, subroutine 230 may advance to stage 360, where computing device 400 may continue comparing entries between the first and second sets of vocabulary data, as described above.

An embodiment consistent with the invention may comprise a system for providing efficient speech recognition. The system may comprise a memory storage and a processing unit coupled to the memory storage. The processing unit may be operative to provide a first plurality of vocabulary data, provide a second plurality of vocabulary data, add at least one decoy entry to the first plurality of vocabulary data wherein the at least one decoy entry comprises at least one entry from the second plurality of vocabulary data, receive an input comprising an audio signal, and determine whether the input matches at least one entry in the first plurality of vocabulary data. In response to determining that the input matches the at least one entry in the first vocabulary data, the processing unit may be further operative to determine whether the input matches the at least one decoy entry in the first vocabulary data and, in response to determining that the input matches the at least one decoy entry in the first vocabulary data, determine whether the input matches at least one entry in the second plurality of vocabulary data.

Another embodiment consistent with the invention may comprise a system for providing efficient speech recognition using two unequal ASR systems. The system may comprise a memory storage and a processing unit coupled to the memory storage. The processing unit may be operative to access a first plurality of vocabulary data, access a second plurality of vocabulary data, and add at least one decoy entry to the first plurality of vocabulary data wherein the at least one decoy entry comprises at least one entry from the second plurality of vocabulary data. The processing unit may be further operative to compare each entry in the first plurality of vocabulary data to each entry in the second plurality of vocabulary data, determine whether at least one entry in the first plurality of vocabulary data is confusable with at least one entry in the second plurality of vocabulary data, in response to determining that at least one entry in the first plurality of vocabulary data is confusable with at least one entry in the second plurality of vocabulary data, add the at least one entry in the second plurality of vocabulary data that is confusable with the at least one entry in the first plurality of vocabulary data to the first plurality of vocabulary data. The processing unit may be further operative to receive an input comprising a speech signal, determine whether the input matches at least one entry in the first plurality of vocabulary data, in response to determining that the input matches the at least one entry in the first vocabulary data, determine whether the input matches the at least one decoy entry in the first vocabulary data, and in response to determining that the input matches the at least one decoy entry in the first vocabulary data, determine whether the input matches at least one entry in the second plurality of vocabulary data.

Yet another embodiment consistent with the invention may comprise a system for providing efficient speech recognition. The system may comprise a memory storage and a processing unit coupled to the memory storage. The processing unit may be operative to provide a first plurality of vocabulary data, provide a second plurality of vocabulary data, wherein the second plurality of vocabulary data comprises a larger number of entries than the first plurality of vocabulary data, and add at least one decoy entry to the first plurality of vocabulary data wherein the at least one decoy entry may comprise at least one entry from the second plurality of vocabulary data. Consistent with embodiments of the invention, being operative to add at least one decoy entry to the first plurality of vocabulary data may comprise being operative to compare each entry in the first plurality of vocabulary data to each entry in the second plurality of vocabulary data, determine whether at least one entry in the first plurality of vocabulary data may be confusable with at least one entry in the second plurality of vocabulary data, wherein being operative to determine whether at least one entry in the first plurality of vocabulary data may be confusable with at least one entry in the second plurality of vocabulary data may comprise being operative to calculate a confusion score based on a comparison of each entry in the first plurality of vocabulary data with each entry in the second plurality of vocabulary data, and determine whether the calculated confusion score comprises a value indicating that at least one entry in the first plurality of vocabulary data is confusable with at least one entry in the second plurality of vocabulary data.

In response to determining that at least one entry in the first plurality of vocabulary data may be confusable with at least one entry in the second plurality of vocabulary data, the processing unit may be further operative to add the at least one entry in the second plurality of vocabulary data that may be confusable with the at least one entry in the first plurality of vocabulary data to the first plurality of vocabulary data according to at least one of the following configurable options: adding all of the at least one entries in the second plurality of vocabulary data to the first plurality of vocabulary data comprising a confusion score greater than a confusion threshold Theta (a neighborhood of fixed radius) and adding a predefined number N of the at least one entries in the second plurality of vocabulary data to the first plurality of vocabulary data comprising the highest confusion scores (a neighborhood of fixed capacity). Threshold Theta or cardinality N may be estimated from training data associated with at least one user of a speech recognition system.

The processing unit may be further operative to associate the added entry to the first plurality of vocabulary data with the at least one entry in the first plurality of vocabulary data as a decoy entry, receive an input comprising an audible signal which may comprise a spoken utterance, and determine whether the input matches at least one entry in the first plurality of vocabulary data. Consistent with embodiments of the invention, being operative to determine whether the input matches at least one entry in the first plurality of vocabulary data may comprise being operative to assign a recognition score based on a comparison of the input with each entry in the first plurality of vocabulary data, determine whether at least one recognition score assigned to the comparison of the input with each entry in the first plurality of vocabulary data results in a confidence score that exceeds a confidence threshold associated with the entry in the first plurality of vocabulary data.

In response to determining that the input matches the at least one entry in the first vocabulary data, the processing unit may be operative to determine whether the matching entry is a decoy entry in the first vocabulary data and, in response to determining that the input matches the decoy entry in the first vocabulary data, determine whether the input matches at least one entry in the second plurality of vocabulary data. In response to determining that the input does not match at least one entry in the first plurality of vocabulary data, the processing unit may be operative to determine whether the input matches at least one entry in the second plurality of vocabulary data.

FIG. 4 is a block diagram of a system including computing device 400. Consistent with an embodiment of the invention, the aforementioned memory storage and processing unit may be implemented in a computing device, such as computing device 400 of FIG. 4. Any suitable combination of hardware, software, or firmware may be used to implement the memory storage and processing unit. For example, the memory storage and processing unit may be implemented with computing device 400 or any of other computing devices 418, in combination with computing device 400. The aforementioned system, device, and processors are examples and other systems, devices, and processors may comprise the aforementioned memory storage and processing unit, consistent with embodiments of the invention. Furthermore, computing device 400 may comprise an operating environment for system 100 as described above. System 100 may operate in other environments and is not limited to computing device 400.

With reference to FIG. 4, a system consistent with an embodiment of the invention may include a computing device, such as computing device 400. In a basic configuration, computing device 400 may include at least one processing unit 402 and a system memory 404. Depending on the configuration and type of computing device, system memory 404 may comprise, but is not limited to, volatile (e.g. random access memory (RAM)), non-volatile (e.g. read-only memory (ROM)), flash memory, or any combination. System memory 404 may include operating system 405, at least one programming module 406, and may include a program data 407. Operating system 405, for example, may be suitable for controlling computing device 400's operation. In one embodiment, programming modules 406 may include first speech recognizer 120 and second speech recognizer 130. Furthermore, embodiments of the invention may be practiced in conjunction with a graphics library, other operating systems, or any other application program and is not limited to any particular application or system. This basic configuration is illustrated in FIG. 4 by those components within a dashed line 408.

Computing device 400 may have additional features or functionality. For example, computing device 400 may also include additional data storage devices (removable and/or non-removable) such as, for example, magnetic disks, optical disks, or tape. Such additional storage is illustrated in FIG. 4 by removable storage 409 and non-removable storage 410. Computer storage media may include volatile and nonvolatile, removable and non-removable media implemented in any method or technology for storage of information, such as computer readable instructions, data structures, program modules, or other data. System memory 404, removable storage 409, and non-removable storage 410 are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 400. Any such computer storage media may be part of device 400. Computing device 400 may also have input device(s) 412 such as a keyboard, a mouse, a pen, a sound input device, a touch input device, etc. Output device(s) 414 such as a display, speakers, a printer, etc. may also be included. The aforementioned devices are examples and others may be used.

Computing device 400 may also contain a communication connection 416 that may allow device 400 to communicate with other computing devices 418, such as over a network in a distributed computing environment, for example, an intranet or the Internet. Communication connection 416 is one example of communication media. Communication media may typically be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer readable media as used herein may include both storage media and communication media.

As stated above, a number of program modules and data files may be stored in system memory 404, including operating system 405. While executing on processing unit 402, programming modules 406 (e.g. first speech recognizer 120) may perform processes including, for example, at least one of method 200's stages as described above. The aforementioned process is an example, and processing unit 402 may perform other processes. Other programming modules that may be used in accordance with embodiments of the present invention may include electronic mail and contacts applications, word processing applications, spreadsheet applications, database applications, slide presentation applications, drawing or computer-aided application programs, etc.

Generally, consistent with embodiments of the invention, program modules may include routines, programs, components, data structures, and other types of structures that may perform particular tasks or that may implement particular abstract data types. Moreover, embodiments may be practiced with other computer system configurations, including hand-held devices, multiprocessor systems, microprocessor-based or programmable consumer electronics, minicomputers, mainframe computers, and the like. Embodiments of the invention may also be practiced in distributed computing environments where tasks are performed by remote processing devices that are linked through a communications network. In a distributed computing environment, program modules may be located in both local and remote memory storage devices.

Furthermore, embodiments of the invention may be practiced in an electrical circuit comprising discrete electronic elements, packaged or integrated electronic chips containing logic gates, a circuit utilizing a microprocessor, or on a single chip containing electronic elements or microprocessors. Embodiments of the invention may also be practiced using other technologies capable of performing logical operations such as, for example, AND, OR, and NOT, including but not limited to mechanical, optical, fluidic, and quantum technologies. In addition, embodiments of the invention may be practiced within a general purpose computer or in any other circuits or systems.

Embodiments of the invention, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present invention may be embodied in hardware and/or in software (including firmware, resident software, micro-code, etc.). In other words, embodiments of the present invention may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present invention, for example, are described above with reference to block diagrams and/or operational illustrations of methods, systems, and computer program products according to embodiments of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the invention have been described, other embodiments may exist. Furthermore, although embodiments of the present invention have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the invention.

All rights including copyrights in the code included herein are vested in and the property of the Applicant. The Applicant retains and reserves all rights in the code included herein, and grants permission to reproduce the material only in connection with reproduction of the granted patent and for no other purpose.

While the specification includes examples, the invention's scope is indicated by the following claims. Furthermore, while the specification has been described in language specific to structural features and/or methodological acts, the claims are not limited to the features or acts described above. Rather, the specific features and acts described above are disclosed as example for embodiments of the invention.

What is claimed is:

1. A method implemented on a computing device for providing efficient speech recognition, the method comprising:
   on the computing device, providing a first plurality of vocabulary data;
   providing a second plurality of vocabulary data;
   adding at least one decoy entry to the first plurality of vocabulary data wherein the at least one decoy entry comprises at least one entry from the second plurality of vocabulary data;
   receiving an input comprising an audio signal;
   determining whether the input matches at least one entry in the first plurality of vocabulary data;
   in response to determining that the input matches the at least one entry in the first vocabulary data, determining whether the matched at least one entry comprises the at least one decoy entry in the first vocabulary data; and
   in response to determining that the matched at least one entry comprises the at least one decoy entry in the first vocabulary data, determining whether the input matches at least one entry in the second plurality of vocabulary data.

2. The method of claim 1, further comprising:
   in response to determining that the input does not match at least one entry in the first plurality of vocabulary data, determining whether the input matches at least one entry in the second plurality of vocabulary data.

3. The method of claim 1, wherein adding at least one decoy entry to the first plurality of vocabulary data wherein the at least one decoy entry comprises at least one entry from the second plurality of vocabulary data comprises:
   comparing each entry in the first plurality of vocabulary data to each entry in the second plurality of vocabulary data;
   determining whether at least one entry in the first plurality of vocabulary data is confusable with at least one entry in the second plurality of vocabulary data;
   in response to determining that at least one entry in the first plurality of vocabulary data is confusable with at least one entry in the second plurality of vocabulary data, adding the at least one entry in the second plurality of vocabulary data that is confusable with the at least one entry in the first plurality of vocabulary data to the first plurality of vocabulary data; and
   associating the added entry to the first plurality of vocabulary data with the at least one entry in the first plurality of vocabulary data as a decoy entry.

4. The method of claim 3, wherein determining whether at least one entry in the first plurality of vocabulary data is confusable with at least one entry in the second plurality of vocabulary data comprises:
   calculating a confusability score based on a comparison of each entry in the first plurality of vocabulary data with each entry in the second plurality of vocabulary data; and
   determining whether the calculated confusability score comprises a value indicating that at least one entry in the first plurality of vocabulary data is confusable with at least one entry in the second plurality of vocabulary data.

5. The method of claim 4, wherein calculating the confusability score based on a comparison of each entry in the first plurality of vocabulary data with each entry in the second plurality of vocabulary data comprises:
   comparing a phonetic representation of each entry in the first plurality of vocabulary data with a phonetic representation of each entry in the second plurality of vocabulary data; and
   calculating an edit distance between the phonetic representation of each entry in the first plurality of vocabulary data with the phonetic representation of each entry in the second plurality of vocabulary data.

6. The method of claim 4, wherein calculating the confusability score based on a comparison of each entry in the first plurality of vocabulary data with each entry in the second plurality of vocabulary data comprises deriving a metric of natural confusability from a set of training data.

7. The method of claim 1, further comprising:
   determining whether an entry in the first plurality of vocabulary data has been confused with an entry in the second plurality of vocabulary data; and
   creating a record of the confusion of the entry in the first plurality of vocabulary data with the entry in the second plurality of vocabulary data.

8. The method of claim 4, wherein calculating the score based on a comparison of each entry in the first plurality of vocabulary data with each entry in the second plurality of vocabulary data comprises deriving a metric of natural confusability for each comparison from at least one set of training data, wherein the metric of natural confusability is associated with the entirety of the entry.

9. The method of claim 6, wherein the likelihood of confusion for each compared phoneme is based on at least one of the following: training data from at least one user and historical data from a plurality of users.

10. The method of claim 7, further comprising adding a decoy entry comprising the entry in the second plurality of vocabulary data confused with the entry in the first plurality of vocabulary data to the first plurality of vocabulary data.

11. The method of claim 1, further comprising:
    receiving a new entry to the first plurality of vocabulary data; and
    determining whether the new entry in the first plurality of vocabulary data is confusable with at least one entry in the second plurality of vocabulary data; and
    in response to determining that the new entry in the first plurality of vocabulary data is confusable with at least one entry in the second plurality of vocabulary data, adding the at least one entry in the second plurality of vocabulary data that is confusable with the at least one entry in the first plurality of vocabulary data to the first plurality of vocabulary data.

12. The method of claim 1, wherein the first plurality of vocabulary data comprises fewer entries than the second plurality of vocabulary data.

13. The method of claim 1, wherein determining whether the input matches at least one entry in the first plurality of vocabulary data comprises:
    determining whether the input is within a confidence threshold for determining a match; and
    periodically adjusting the confidence threshold for determining a match according to training data from at least one user.

14. The method of claim 13, wherein each entry in the first plurality of vocabulary data requires the same confidence threshold for determining a match with the input.

15. The method of claim 13, wherein the confidence threshold for determining a match between each entry in the first plurality of vocabulary data and the input is separately configurable.

16. A system for providing efficient speech recognition, the system comprising:
a memory storage; and
a processing unit coupled to the memory storage, wherein the processing unit is operative to:
access a first plurality of vocabulary data;
access a second plurality of vocabulary data;
add at least one decoy entry to the first plurality of vocabulary data wherein the at least one decoy entry comprises at least one entry from the second plurality of vocabulary data, wherein being operative to add the at least one decoy entry to the first plurality of vocabulary data comprises being operative to:
compare each entry in the first plurality of vocabulary data to each entry in the second plurality of vocabulary data,
determine whether at least one entry in the first plurality of vocabulary data is confusable with at least one entry in the second plurality of vocabulary data,
in response to determining that at least one entry in the first plurality of vocabulary data is confusable with at least one entry in the second plurality of vocabulary data, add the at least one entry in the second plurality of vocabulary data that is confusable with the at least one entry in the first plurality of vocabulary data to the first plurality of vocabulary data, and
associate the added entry to the first plurality of vocabulary data with the at least one entry in the first plurality of vocabulary data as a decoy entry;
receive an input comprising a speech signal;
determine whether the input matches at least one entry in the first plurality of vocabulary data;
in response to determining that the input matches the at least one entry in the first vocabulary data, determine whether the matched at least one entry comprises the at least one decoy entry in the first vocabulary data; and
in response to determining that the matched at least one entry comprises the at least one decoy entry in the first vocabulary data, determine whether the input matches at least one entry in the second plurality of vocabulary data.

17. The system of claim 16, wherein the processing unit is further operable to:
determine whether an entry in the first plurality of vocabulary data has been confused with an entry in the second plurality of vocabulary data;
create at least one record of the confusion of the entry in the first plurality of vocabulary data with the entry in the second plurality of vocabulary data; and
re-determine whether at least one entry in the first plurality of vocabulary data is confusable with at least one entry in the second plurality of vocabulary data based on the at least one record of the confusion of the entry in the first plurality of vocabulary data with the entry in the second plurality of vocabulary data.

18. The system of claim 16, wherein being operative to access the first plurality of vocabulary data comprises being operative to access a locally stored first recognition resource operative to provide the first plurality of vocabulary data; and
wherein being operative to access the second plurality of vocabulary data comprises being operative to access a remotely stored second recognition resource operative to provide the second plurality of vocabulary data.

19. The system of claim 16, wherein being operative to determine whether at least one entry in the first plurality of vocabulary data is confusable with at least one entry in the second plurality of vocabulary data comprises being operative to calculate a weighted edit distance between a pronunciation of each entry in the first plurality of vocabulary data and a pronunciation of each entry in the second plurality of vocabulary data.

20. A computer-readable memory which stores a set of instructions which, when executed, performs a method for providing efficient speech recognition, the method executed by the set of instructions comprising:
providing a first plurality of vocabulary data;
providing a second plurality of vocabulary data, wherein the second plurality of vocabulary data comprises a larger number of entries than the first plurality of vocabulary data;
adding at least one decoy entry to the first plurality of vocabulary data wherein the at least one decoy entry comprises at least one entry from the second plurality of vocabulary data, wherein adding at least one decoy entry to the first plurality of vocabulary data comprises:
comparing each entry in the first plurality of vocabulary data to each entry in the second plurality of vocabulary data,
determining whether at least one entry in the first plurality of vocabulary data is confusable with at least one entry in the second plurality of vocabulary data, wherein determining whether at least one entry in the first plurality of vocabulary data is confusable with at least one entry in the second plurality of vocabulary data comprises:
calculating a confusion score based on a comparison of each entry in the first plurality of vocabulary data with each entry in the second plurality of vocabulary data, and
determining whether the calculated confusion score comprises a value indicating that at least one entry in the first plurality of vocabulary data is confusable with at least one entry in the second plurality of vocabulary data;
in response to determining that at least one entry in the first plurality of vocabulary data is confusable with at least one entry in the second plurality of vocabulary data, adding the at least one entry in the second plurality of vocabulary data that is confusable with the at least one entry in the first plurality of vocabulary data to the first plurality of vocabulary data according to at least one of the following: adding all of the at least one entries in the second plurality of vocabulary data to the first plurality of vocabulary data comprising a confusion score greater than a confusion threshold and adding a predefined number of the at least one entries in the second plurality of vocabulary data to the first plurality of vocabulary data comprising the highest confusion scores, and
associating the added entry to the first plurality of vocabulary data with the at least one entry in the first plurality of vocabulary data as a decoy entry;
receiving an input comprising an audible signal;
determining whether the input matches at least one entry in the first plurality of vocabulary data, wherein determining whether the input matches at least one entry in the first plurality of vocabulary data comprises:

assigning a recognition score based on a comparison of the input with each entry in the first plurality of vocabulary data, converting the recognition score associated with each entry in the first plurality of vocabulary data to a posterior probability, computing a confidence score as a difference between the posterior probability of the input with the highest recognition score and the input with the next highest recognition score, and determining whether the confidence score exceeds a confidence threshold associated with the entry comprising the highest recognition score in the first plurality of vocabulary data;

in response to determining that the input matches the at least one entry in the first vocabulary data, determining whether the matched entry comprises the at least one decoy entry in the first vocabulary data;

in response to determining that the matched entry comprises the at least one decoy entry in the first vocabulary data, determining whether the input matches at least one entry in the second plurality of vocabulary data; and in response to determining that the input does not match at least one entry in the first plurality of vocabulary data, determining whether the input matches at least one entry in the second plurality of vocabulary data.

\* \* \* \* \*